(12) United States Patent
Kikuchi

(10) Patent No.: US 9,878,735 B2
(45) Date of Patent: Jan. 30, 2018

(54) WORM REDUCTION GEAR AND STEERING SYSTEM

(71) Applicant: JTEKT CORPORATION, Osaka-shi, Osaka (JP)

(72) Inventor: Arata Kikuchi, Soraku-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/149,950

(22) Filed: May 9, 2016

(65) Prior Publication Data

US 2016/0339947 A1     Nov. 24, 2016

(30) Foreign Application Priority Data

May 21, 2015   (JP) ................................. 2015-103717

(51) Int. Cl.
| | |
|---|---|
| *F16H 1/16* | (2006.01) |
| *B62D 5/04* | (2006.01) |
| *B23F 5/24* | (2006.01) |
| *B23F 5/22* | (2006.01) |
| *B62D 3/10* | (2006.01) |
| *F16H 55/08* | (2006.01) |

(52) U.S. Cl.
CPC .............. *B62D 5/0454* (2013.01); *B23F 5/22* (2013.01); *B23F 5/24* (2013.01); *B62D 3/10* (2013.01); *B62D 5/0409* (2013.01); *F16H 1/16* (2013.01); *F16H 55/08* (2013.01)

(58) Field of Classification Search
CPC ...... B62D 5/0454; B62D 5/0409; B62D 3/10; F16H 1/16; F16H 55/08

USPC .......................................................... 409/11
See application file for complete search history.

(56) References Cited

U.S. PATENT DOCUMENTS 7,661,332 B2 * 2/2010 Maeda ................. B62D 5/0409
74/388 PS

FOREIGN PATENT DOCUMENTS

| DE | 102007011429 A1 | 9/2007 |
|---|---|---|
| JP | 2003-334724 A | 11/2003 |

OTHER PUBLICATIONS

Oct. 21, 2016 Extended Search Report issued in European Patent Application No. 16169319.7.
Hong-Sheng Fang et al, "Mathematical Model and Bearing Conacts of the ZK-Type Worm Gear Set Cut by Oversize Hob Cutters", Mechanisim and Machine Theory, Oxford GB, vol. 31, No. 3, pp. 271-282, Jan. 1, 1996.

* cited by examiner

*Primary Examiner* — William Kelleher
*Assistant Examiner* — Randell J Krug
(74) *Attorney, Agent, or Firm* — Oliff PLC

(57) ABSTRACT

A worm reduction gear satisfies following relational Formula (1) and Formula (2):

$$3 \geq D2/D1 \geq 1.7 \quad (1)$$

$$0.1° \leq \alpha - \beta \leq 0.5° \quad (2)$$

where D1 is an outside diameter of a worm, D2 is an outside diameter of a hob for cutting a worm wheel to form tooth spaces, and $\alpha$ is a pressure angle of the worm wheel and $\beta$ is a pressure angle of the worm at an intermeshing pitch circle of the worm and the worm wheel.

2 Claims, 4 Drawing Sheets

WORM REDUCTION GEAR AND STEERING SYSTEM

INCORPORATION BY REFERENCE

The disclosure of Japanese Patent Application No. 2015-103717 filed on May 21, 2015 including the specification, drawings and abstract, is incorporated herein by reference in its entirety.

BACKGROUND OF THE INVENTION

1. Field of the Invention

The present invention relates to a worm reduction gear and a steering system including this worm reduction gear.

2. Description of Related Art

In an electric power steering system disclosed in Japanese Patent Application Publication No. 2003-334724 (JP 2003-334724 A), the rotation of a motor for generating steering assist force is transmitted to wheels through a worm and a worm wheel that meshes with this worm so as to change the steering angle. The worm wheel is formed by hobbing.

When the outside diameter of a hob used for hobbing a worm wheel is made closer to the outside diameter of a worm, the shape of each tooth space of the worm wheel after being bobbed more closely resembles the shape of a tooth of the worm. This configuration can theoretically reduce errors in torque transmission between the worm and the worm wheel (what is called "torque fluctuations"), However, in this case, there is no margin to allow assembling errors or machining errors of the worm wheel. Thus, when such errors occur, the positions where the tooth of the worm and the teeth of the worm wheel come into contact with each other may change from the appropriate positions.

SUMMARY OF THE INVENTION

An object of the present invention is to provide a worm reduction gear that can reduce torque fluctuations while allowing assembling errors and machining errors, and a steering system including the worm reduction gear.

A worm reduction gear according to one aspect of the present invention includes: a worm; and a worm wheel including tooth spaces that mesh with the worm, in which following relational Formula (1) and Formula (2) are satisfied:

$$3 \geq D2/D1 \geq 1.7 \quad (1)$$

$$0.1° \leq \alpha - \beta \leq 0.5° \quad (2)$$

where D1 is an outside diameter of the worm, D2 is an outside diameter of a hob for cutting the worm wheel to form the tooth spaces, and $\alpha$ is a pressure angle of the worm wheel and $\beta$ is a pressure angle of the worm at an intermeshing pitch circle of the worm and the worm wheel.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
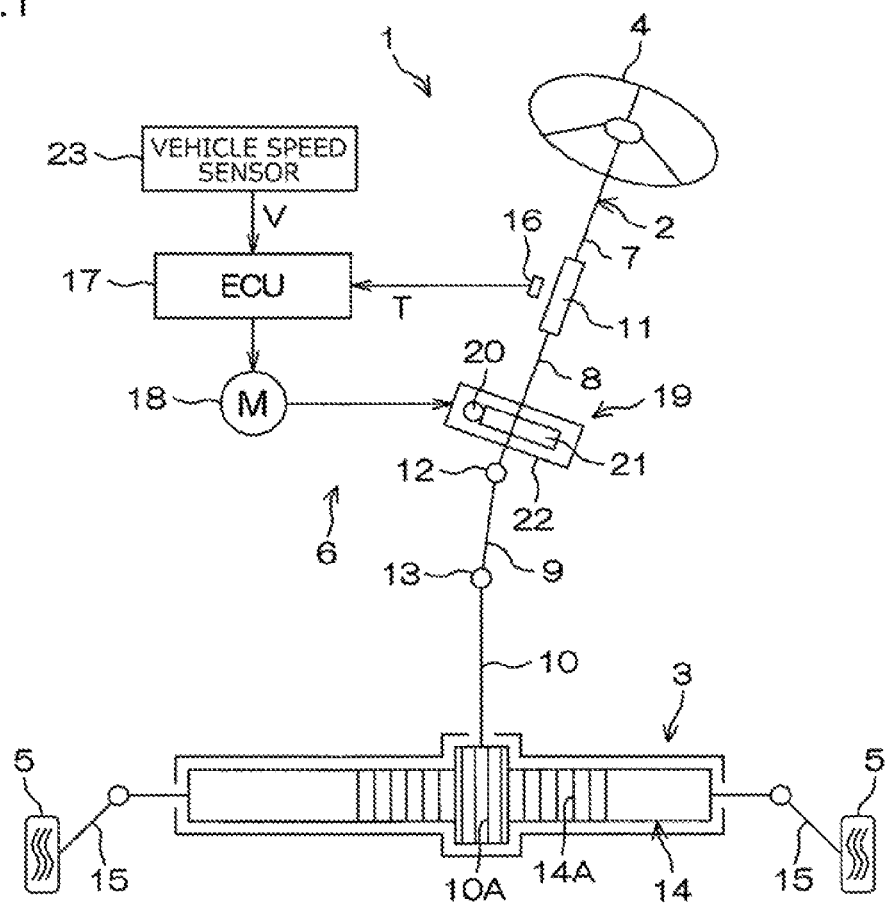
FIG. 1 is a schematic diagram of a steering system according to one embodiment of the present invention.

Embodiments of the present invention will now be described in detail with reference to the accompanying drawings. FIG. 1 is a schematic diagram of a steering system 1 according to one embodiment of the present invention. As depicted in FIG. 1, the steering system 1 is an electric power steering system, including a steering mechanism 2 and a steering operation mechanism 3. The steering system 1 steers steered wheels 5 in response to steering (steering operation) of a steering wheel 4 (steering member) performed by a driver. The steering mechanism 2 includes an assist mechanism 6 that assists the driver in performing steering operation.

The steering mechanism 2 includes an input shaft 7, an output shaft 8, an intermediate shaft 9, and a pinion shaft 10. The input shaft 7 is coupled to the steering wheel 4. One end of the output shaft 8 is coupled to the input shaft 7 through a torsion bar 11, and the other end thereof is coupled to the intermediate shaft 9 through a universal joint 12. The intermediate shaft 9 is coupled to a pinion shaft 10 including a pinion 10A through a universal joint 13.

The steering operation mechanism 3 includes a rack shaft 14 and tie rods 15. The rack shaft 14 includes a rack 14A that meshes with the pinion 10A. One end of each tie rod 15 is coupled to the rack shaft 14, and the other end thereof is coupled to the corresponding steered wheel 5. When the driver is operating the steering wheel 4, the rotation of the steering wheel 4 rotates the pinion shaft 10 through the input shaft 7, the output shaft 8, and the intermediate shaft 9. The rotation of the pinion shaft 10 is converted into reciprocating motion of the rack shaft 14 in the axial direction thereof by the steering operation mechanism 3. In response to the reciprocating motion of the rack shaft 14 in the axial direction, the steered angle of the steered wheels 5 changes.

The assist mechanism 6 includes a torque sensor 16, an electronic control unit (ECU) 17, an electric motor 18 for auxiliary steering, and a worm reduction gear 19. The worm reduction gear 19 includes a worm 20, a worm wheel 21, and a housing 22. The worm wheel 21 is a reduction gear that meshes with the worm 20. The housing 22 accommodates the worm 20 and the worm wheel 21. The worm 20 is coupled to a rotary shaft (not depicted) of the electric motor 18. The worm wheel 21 is coupled to the output shaft 8 in an integrally rotatable manner.

When the steering wheel 4 is rotated by steering performed by the driver, the torque sensor 16 detects the amount of torsion between the input shaft 7 and the output shaft 8. The ECU 17 determines an assist torque based on steering torque T and vehicle speed V, for example, The steering torque T is obtained based on the amount of torsion detected by the torque sensor 16. The vehicle speed V is detected by a vehicle speed sensor 23. The ECU 17 controls driving of the electric motor 18. The electric motor 18 thus driven in response to steering of the steering wheel 4 transmits output rotation to the worm 20 to rotate the worm 20. The worm wheel 21 meshing with the worm 20 rotates at a speed lower than that of the worm 20, and the worm wheel 21 and the output shaft 8 integrally rotate. In this manner, the worm reduction gear 19 reduces the speed of the output rotation of the electric motor 18 with the worm wheel 21, and transmits the resulting rotation as assist torque to the output shaft 8 of the steering mechanism 2. Consequently, steering operation of the steering wheel 4 performed by the driver is assisted.

Figure 2:
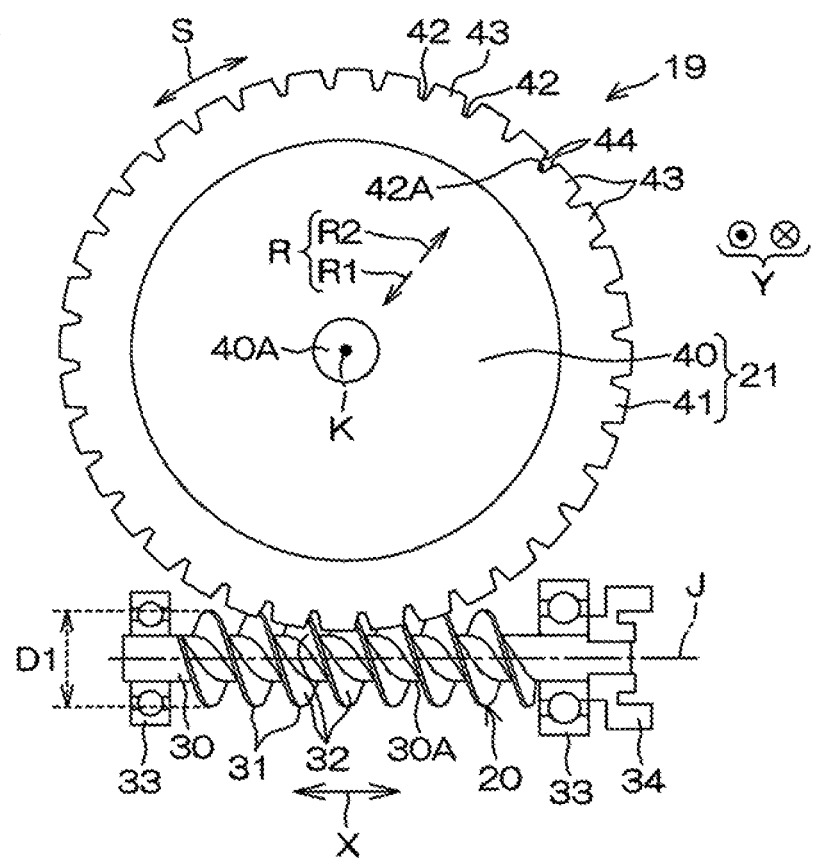
FIG. 2 is a side view of a main part in a worm reduction gear included in the steering system.

The following describes the worm reduction gear 19 in detail. FIG. 2 is a side view of a main part in the worm reduction gear 19. In FIG. 2, illustration of the housing 22 described above is omitted. As depicted in FIG. 2, the worm 20 includes a shaft portion 30 having a cylindrical shape and a tooth 31 that is integrally formed on an outer peripheral surface 30A of the shaft portion 30. The direction in which the central axis J of the shaft portion 30 extends is called herein "axial direction X". The tooth 31 is formed on the outer peripheral surface 30A in a region inside both ends in the axial direction X so as to form a helix centered around the central axis J. The tooth 31 when viewed from the axial direction X has a circular profile having the central axis J as a center of the circle. The diameter of this profile is an outside diameter D1 of the worm 20.

The cross-section of the tooth 31 when sectioned in a virtual plane including the central axis J and extending in the axial direction X is formed in a substantially isosceles trapezoidal shape having a width that narrows toward a direction away from the central axis J (see FIG. 4 described later). Both side surfaces of the tooth 31 in the axial direction X are called herein "tooth flanks 32". To both ends of the shaft portion 30 in the axial direction X, bearings 33 are attached one by one. The worm 20 is rotatably supported by the housing 22 via these bearings 33. At one end (right end in FIG. 2) of the shaft portion 30 in the axial direction X, a joint 34 is attached to a portion protruding from the corresponding bearing 33. The joint 34 is coupled to the rotary shaft (not depicted) of the electric motor 18. Thus, as described above, when the electric motor 18 is driven, the worm 20 is rotated about the central axis J.

The worm wheel 21 is disk-shaped. The central axis K of the worm wheel 21 extends in an axial direction Y that corresponds to the width direction of the worm wheel 21. Hereinafter, the circumferential direction of the worm wheel 21 is called "circumferential direction S", and the radial direction of the worm wheel 21 is called "radial direction R", In the radial direction R, the direction toward the central axis K is referred to as "radially inward R1 " and the direction away from the central axis K is referred to as "radially outward R2 ". The circumferential direction S is a rotational direction of the worm wheel 21.

The worm wheel 21 includes a disk-shaped sleeve 40 and an annular tooth portion 41. The sleeve 40 is positioned on the central axis K side. The tooth portion 41 surrounds the sleeve 40 in an outer periphery that is separated radially outward R2 from the central axis K. The sleeve 40 and the tooth portion 41 may be integrally formed of the same material (e.g., metal). Alternatively, by insert molding, the tooth portion 41 made of resin may be integrated with the sleeve 40 made of metal. At the circle center of the sleeve 40, an insertion hole 40A into which the output shaft 8 is fitted is formed.

On the outer peripheral surface of the tooth portion 41, a plurality of tooth spaces 42 that mesh with the worm 20 are formed at regular intervals in the circumferential direction S. The respective tooth spaces 42 cut out the outer periphery of the tooth portion 41 in the axial direction Y, and each have a shape recessed radially inward R1. When viewed from the axial direction Y, each tooth space 42 is formed in a substantially isosceles trapezoidal shape having a width that narrows radially inward R1. In the tooth portion 41, each projecting portion between the tooth spaces 42 neighboring in the circumferential direction S is a tooth 43 in the worm wheel 21. The cross-section of the tooth 43 when sectioned in a virtual plane orthogonal to the central axis K is formed in a substantially isosceles trapezoidal shape having a width that narrows radially outward R2 (see also FIG. 4). Both side surfaces of each tooth 43 in the circumferential direction S are called herein "tooth flanks 44". The tooth flanks 44 are two-dimensionally illustrated in FIG. 2, but specifically each have a curved shape. The space between each pair of tooth flanks 44 that are opposed with the corresponding tooth space 42 interposed between the teeth 43 neighboring in the circumferential direction S narrows radially inward R1. The pair of tooth flanks 44 defines one tooth space 42. A space bottom 42A of each tooth space 42 is formed as a bottom land between radially inward R1 -side ends of the pair of tooth flanks 44.

Figure 3:
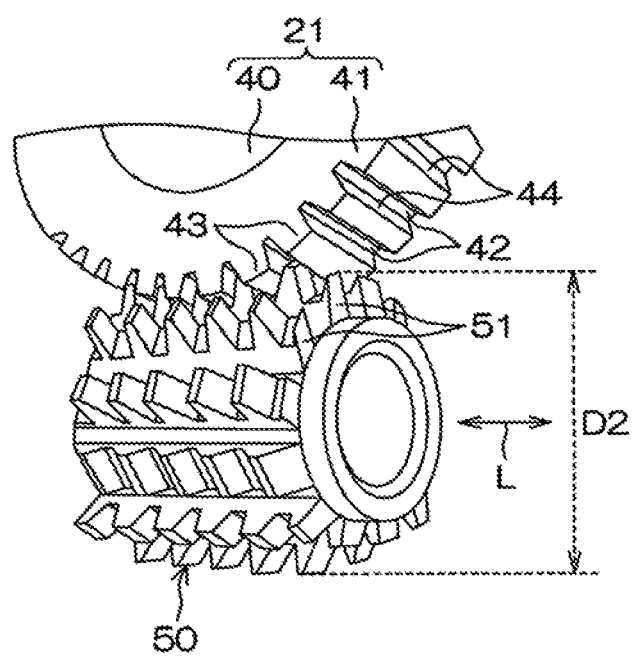
FIG. 3 is a schematic diagram illustrating how a worm wheel of the worm reduction gear is formed by hobbing.

By rotating the hob 50 depicted in FIG. 3 to perform cutting (hobbing) on the worm wheel 21, the tooth spaces 42 are formed. The hob 50 is a cylindrical body having an outer peripheral surface on which a plurality of cutting teeth 51 for cutting the worm wheel 21 are formed in a helically aligned manner. When viewed from the axial direction L of the hob 50, edges of the cutting teeth 51 are arranged on a virtual circle. The diameter of this circle is an outside diameter D2 of the hob 50. This circle is also a rotational path of the edges of the cutting teeth 51 when the hob 50 rotates. The relation between the outside diameter D1 (see FIG. 2) of the worm 20 and the outside diameter D2 of the hob 50 is set so that Formula (1):

$$3 \geq D2/D1 \geq 1.7 \tag{1}$$

is satisfied.

In order to satisfy Formula (1), the outside diameter D2 of the hob 50 is set larger than the outside diameter D1 of the worm 20. Accordingly, the tooth spaces 42 of the worm wheel 21 after being hobbed can receive the tooth 31 of the worm 20 with allowance to some extent, and thus each have a shape that can tolerate assembling errors and machining errors. In other words, properties of being insensitive to assembling errors and machining errors can be imparted to the worm wheel 21.

For reference, if a hob 50 is used that includes a large outside diameter D2 in which the value of D2/D1 is larger than three, the tooth flank 44 of each tooth 43 of the worm wheel 21 after being hobbed has a planar shape. Consequently, the tooth spaces 42 of the worm wheel 21 each have a shape that is significantly different from the shape of the tooth 31 of the worm 20. Thus, intermeshing between the worm 20 and the worm wheel 21 becomes poor, which may cause large torque fluctuations.

Figure 4:
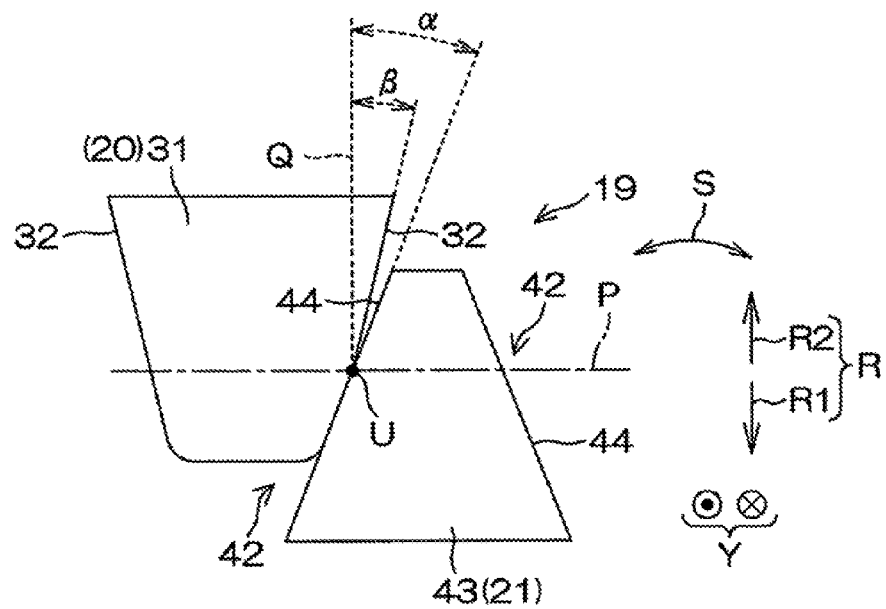
FIG. 4 is a schematic diagram illustrating a part intermeshing between a worm and the worm wheel in the worm reduction gear.

FIG. 4 is a schematic diagram illustrating a part intermeshing between the worm 20 and the worm wheel 21. The long dashed short dashed line in FIG. 4 indicates part of a path of an intermeshing pitch circle P of the worm 20 and the worm wheel 21 in a state in which a tooth flank 32 of a tooth 31 of the worm 20 comes into contact with a tooth flank 44 of a tooth 43 of the worm wheel 21, and the worm 20 accordingly meshes with the worm wheel 21. In FIG. 4, a pressure angle α of the worm wheel 21 and a pressure angle 3 of the worm 20 in the intermeshing pitch circle P are illustrated. The pressure angle α is an acute angle formed by a reference line Q extending along the radial direction R with the tooth flank 44 (specifically, a tangent to the outline of the tooth flank 44 when viewed from the axial direction Y) at an intersection point U of the reference line Q and the intermeshing pitch circle P. The pressure angle β is an acute angle formed by the reference line Q with the tooth flank 32 (specifically, a tangent to the outline of the tooth flank 32 when viewed from the axial direction Y) at the intersection point U. The relation between the pressure angle α and the pressure angle β is set so that Formula (2):

$$0.1° \leq \alpha - \beta \leq 0.5° \quad (2)$$

is satisfied.

Figure 5:
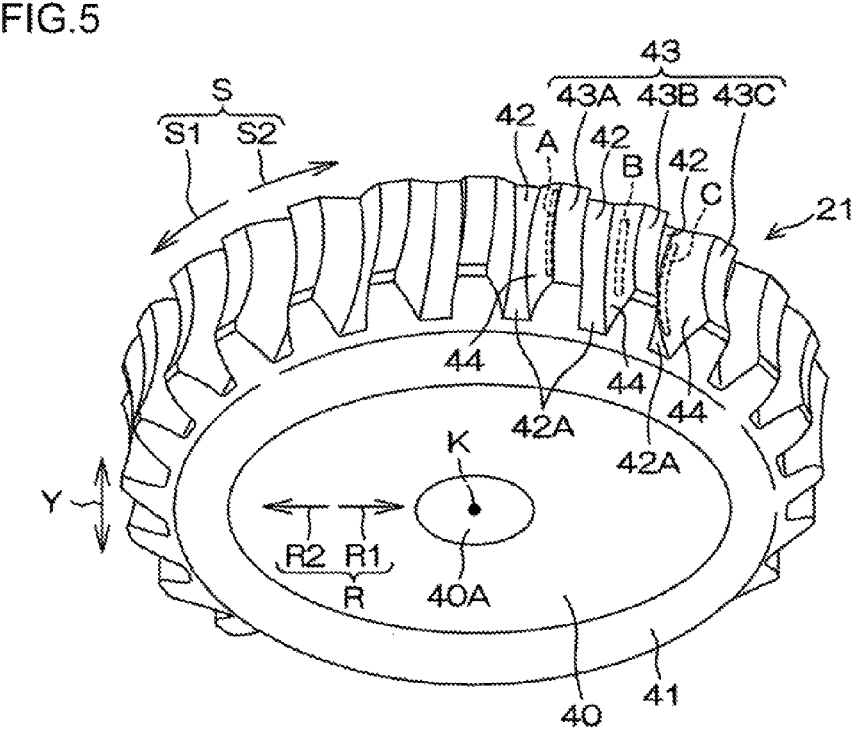
FIG. 5 is a perspective view of the worm wheel.

In order to satisfy Formula (2), the pressure angle α of the worm wheel 21 at the intermeshing pitch circle P is set larger than the pressure angle β of the worm 20. This makes it possible to reduce torque fluctuations between the worm 20 and the worm wheel 21. The details will be described below. FIG. 5 is a perspective view of the worm wheel 21. With reference to FIG. 5, randomly chosen three teeth 43 that are continuously aligned on the worm wheel 21 in the circumferential direction S are focused on. These three teeth 43 are distinguished as a tooth 43A, a tooth 43B, and a tooth 43C in order from one side S1 in the circumferential direction S. When the worm wheel 21, being driven by the rotation of the worm 20, rotates toward the other side S2 that is opposite to the one side Si in the circumferential direction S, the tooth flank 32 of the worm 20 comes into contact with the tooth flank 44 on the one side S1 in each of the tooth 43A, the tooth 43B, and the tooth 43C. An area in the tooth flank 44 with which the tooth flank 32 comes into contact is called herein "contact area". A certain timing during rotation of the worm wheel 21 is now focused on, and when an contact area A between a portion of the tooth 31 of the worm 20 and the tooth 43A that are in a beginning stage of intermeshing exists on the tooth tip side, a contact area B between another portion of the tooth 31 and the tooth 43B that are in an intermediate stage of intermeshing exists between the tooth tip and the tooth root. A contact area C between still another portion of the tooth 31 and the tooth 43C that are in a final stage of intermeshing exists on the tooth root side.

Figure 6:
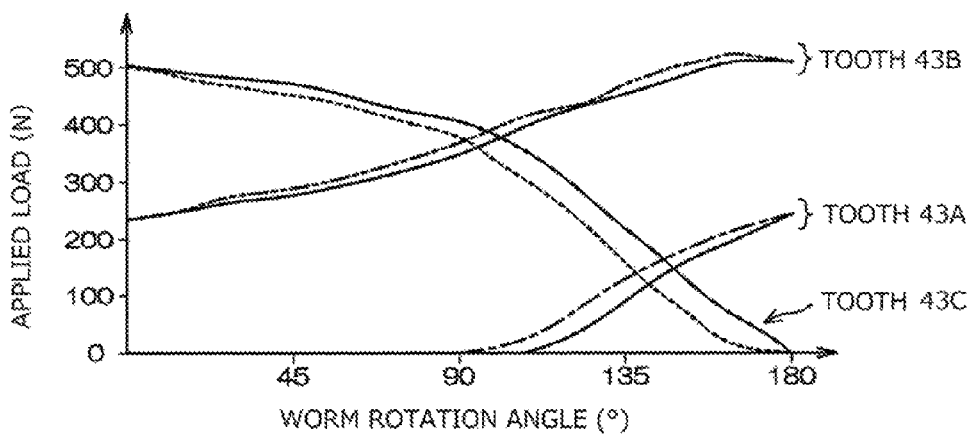
FIG. 6 is a graph illustrating relations between the rotation angle of the worm and the applied load acting on tooth flanks of the worm wheel.

FIG. 6 is a graph illustrating relations between the rotation angle of the worm 20 and the applied load acting on the tooth flanks 44 of the worm wheel 21 when the worm 20 rotates. The applied load herein corresponds to a force of the tooth flank 32 of the worm 20 pressing on each tooth flank 44 of the worm wheel 21. As depicted in FIG. 6, for each of the tooth 43A in the beginning stage of intermeshing and the tooth 43B in the intermediate stage of intermeshing, the applied load increases as the rotation angle of the worm 20 increases. By contrast, for the tooth 43C in the final stage of intermeshing, the applied load decreases as the rotation angle of the worm 20 increases. In FIG. 6, the curves in continuous line indicate changes in applied load in the present embodiment in which the pressure angle α and the pressure angle β are set so as to satisfy Formula (2). The curves in broken line, long dashed short dashed line, and long dashed double-short dashed line indicate changes in applied load in a comparative example in which the pressure angle α and the pressure angle β are the same.

In the present embodiment, reducing the pressure angle β increases intermeshing (in other words, the contact area described above) between the tooth root of each tooth 43 of the worm wheel 21 and the worm 20. This makes the slope of change in applied load less steep. In particular, for the tooth 43C in the final stage of intermeshing, the slope of change in applied load is much less steep than that of the comparative example (see the curve in broken line). The applied load is smaller in the present embodiment than in the comparative example for each of the tooth 43A in the beginning stage of intermeshing and the tooth 43B in the intermediate stage of intermeshing. By contrast, the applied load is much larger for the tooth 43C in the final stage of intermeshing. Consequently, for the entire worm wheel 21, the average applied load is larger. Thus, efficiency of torque transmission from the worm 20 to the worm wheel 21 can be improved.

Figure 7:
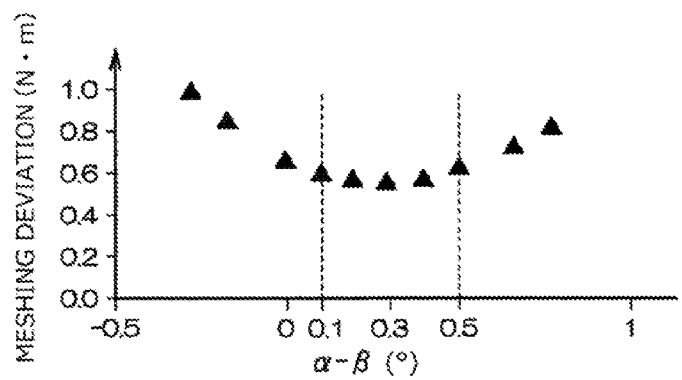
FIG. 7 is a graph illustrating a relation between meshing deviation and difference between the pressure angle of the worm and the pressure angle of the worm wheel.

FIG. 7 is a graph illustrating a relation between meshing deviation and difference between the pressure angle β of the worm 20 and the pressure angle α of the worm wheel 21. The meshing deviation is an index representing difference between an actual value and a target value of torque transmitted from the worm 20 to each tooth 43 of the worm wheel 21. As depicted in FIG. 7, the value of α−β increases when the pressure angle β decreases as described above. When the value of α−β exceeds 0°, the meshing deviation becomes smaller. In particular, when the value of α−β falls within the range of from 0.1° to 0.5° so as to satisfy Formula (2), the meshing deviation becomes significantly smaller, and the meshing deviation becomes smallest at 0.3°. However, when the value of α−β falls outside this range, the meshing deviation increases. In particular, when the pressure angle β is excessively reduced and the value of α−β exceeds 0.5°, tooth contact between the tooth tip of the tooth 43A in the beginning stage of intermeshing in the worm wheel 21 and the worm 20 (in other words, the contact area A described above) decreases, and the contact ratio between the worm 20 and the worm wheel 21 accordingly decreases. This may increase the meshing deviation in torque borne by one tooth 43. Thus, in the present embodiment, the value of α−β is set within the optimal range between 0.1° and 0.5° inclusive as represented by Formula (2) (range within ±0.2° with respect to 0.3°).

Figure 8:
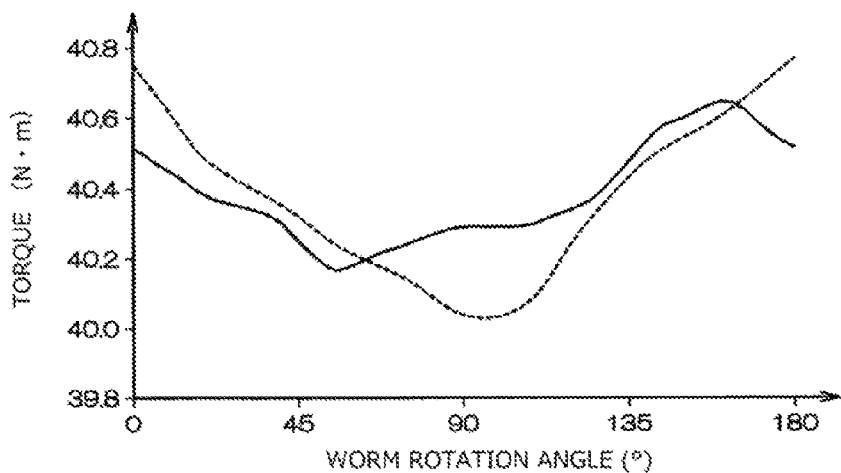
FIG. 8 is a graph illustrating relations between the rotation angle of the worm and torque.

FIG. 8 is a graph illustrating relations between the rotation angle of the worm 20 and torque transmitted from the worm 20 to the worm wheel 21. The torque herein is not torque borne by each tooth 43 of the worm wheel 21, but is torque transmitted to the entire worm wheel 21. In FIG. 8, the curve in continuous line indicates changes in torque in the present embodiment in which the pressure angle α and the pressure angle β are set so as to satisfy Formula (2). The curve in broken line indicates changes in torque in the comparative example in which the pressure angle α and the pressure angle β are the same.

Setting the pressure angle α and the pressure angle β so that the value of α−β falls within the optimal range described above reduces the meshing deviation (see FIG. 7). Furthermore, this setting suppresses reduction in torque transmitted when the tooth root of the tooth 43C in the final stage of intermeshing in the worm wheel 21 meshes with the tooth tip of the tooth 31 of the worm 20. Consequently, as depicted in FIG. 8, in the present embodiment, torque fluctuations can be reduced in comparison with the comparative example. This causes torque to converge toward a reference value (e.g., around 40.4 N·m in FIG. 8).

The value of α−β is preferably equal to or larger than 0.2° and equal to or smaller than 0.4°, which can further reduce torque fluctuations. The present invention is not limited to the embodiments described above, and various modifications can be made within the scope of the claims. For example, in a state in which the worm 20 meshes with the worm wheel 21, when viewed from the radially outward R2 side, the central axis J of the worm 20 and the central axis K of the worm wheel 21 may be orthogonal to each other as in the present embodiment (see FIG. 2), or may extend obliquely to each other.

Specific values for the applied load illustrated in FIG. 6, specific values for the meshing deviation illustrated in FIG. 7, and specific values for the torque illustrated in FIG. 8 are merely examples, and vary depending on sizes of the worm 20 and the worm wheel 21.

What is claimed is:

1. A worm reduction gear comprising:
   a worm; and
   a worm wheel including tooth spaces that mesh with the worm, wherein following relational Formula (1) and Formula (2) are satisfied:

$$3 \geq D2/D1 \geq 1.7 \tag{1}$$

$$0.1° \leq \alpha - \beta \leq 0.5° \tag{2}$$

where D1 is an outside diameter of the worm, D2 is an outside diameter of a hob for cutting the worm wheel to form the tooth spaces, and $\alpha$ is a first acute angle formed by a reference line extending along a radial direction of the worm wheel with a worm wheel tooth flank and $\beta$ is a second acute angle formed by the reference line with the worm tooth flank at an intermeshing pitch circle of the worm and the worm wheel.

2. A steering system comprising:
   an electric motor for auxiliary steering; and
   the worm reduction gear as claimed in claim 1 that reduces rotation of the electric motor.

* * * * *